United States Patent
Dai

(10) Patent No.: US 8,836,524 B2
(45) Date of Patent: Sep. 16, 2014

(54) DETECTING DEVICE AND BATTERY BOX USING THE SAME

(75) Inventor: Lung Dai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 412 days.

(21) Appl. No.: 13/114,085

(22) Filed: May 24, 2011

(65) Prior Publication Data

US 2011/0316710 A1     Dec. 29, 2011

(30) Foreign Application Priority Data

Jun. 28, 2010   (CN) .......................... 2010 1 0210248

(51) Int. Cl.
    *G08B 21/00*     (2006.01)
    *H01M 6/50*     (2006.01)
    *H01M 10/42*     (2006.01)
    *H01M 6/06*     (2006.01)
    *H01M 10/052*     (2010.01)

(52) U.S. Cl.
    CPC ........ *H01M 10/4228* (2013.01); *H01M 6/5033* (2013.01); *H01M 6/06* (2013.01); *Y02E 60/12* (2013.01); *H01M 10/052* (2013.01)
    USPC ............ 340/636.19; 73/40; 73/49.2; 73/49.3; 324/525; 324/691; 429/90

(58) Field of Classification Search
    USPC .................................................. 340/636.19
    See application file for complete search history.

(56) References Cited

U.S. PATENT DOCUMENTS

| | | | | |
|---|---|---|---|---|
| 3,786,466 | A | * | 1/1974 | Naito et al. .................... 340/651 |
| 5,382,946 | A | * | 1/1995 | Gale ............................. 340/650 |
| 5,824,883 | A | * | 10/1998 | Park et al. ......................... 73/40 |
| 6,288,520 | B1 | * | 9/2001 | Kim ............................. 320/112 |
| 6,337,559 | B1 | * | 1/2002 | Sato ............................. 320/134 |
| 8,211,559 | B1 | * | 7/2012 | Waggoner ....................... 429/90 |
| 2007/0229294 | A1 | * | 10/2007 | Vossmeyer et al. ...... 340/636.19 |
| 2010/0102975 | A1 | * | 4/2010 | Vossmeyer et al. ...... 340/636.19 |

OTHER PUBLICATIONS

"Current Limiting Power Resistors for High-Power LED Module Lighting Applications", Bourns, Inc <http://www.bourns.com/pwr/docs/bourns_pwr263_led_apno.pdf>.*

* cited by examiner

*Primary Examiner* — Nabil Syed
*Assistant Examiner* — Adnan Aziz
(74) *Attorney, Agent, or Firm* — Novak Druce Connolly Bove + Quigg LLP

(57) ABSTRACT

A detecting device is used for detecting a battery leak, a positive terminal of the battery is electrically connected to a first contact, a negative terminal of the battery is electrically connected to a second contact. The detecting device includes a first conductor, a second conductor electrically connected to the second contact, and a warning unit electrically connected between the first contact and the first conductor. The second conductor being electrically connected to the first conductor through electrolyte leaked out of the battery, thus the warning unit will be actuated to produce a warning signal.

7 Claims, 3 Drawing Sheets

DETECTING DEVICE AND BATTERY BOX USING THE SAME

BACKGROUND

1. Technical Field

The disclosed embodiments relate to detecting devices, and more particularly to a detecting device for detecting battery leaks and a battery box using the same.

2. Description of Related Art

Electronic devices, for example, notebook computers, mobile phones, and audio/video equipments, etc., use rechargeable or non-rechargeable batteries as power supply. Battery cells, especially lithium ion battery cells used in rechargeable batteries, contain hazardous chemicals, which can become quite dangerous if the battery shell becomes leaky. Such leakage can be caused by material ageing, and/or if the batteries are subjected to extreme environmental changes (e.g. temperature variations).

However, batteries are usually mounted inside of a battery box of an electronic device. Users must open the battery box to determine whether there is a battery leak, which is neither timely nor safe.

What is needed, therefore, is a detecting device and a battery box to overcome the above described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout three views.

DETAILED DESCRIPTION

Figure 1:
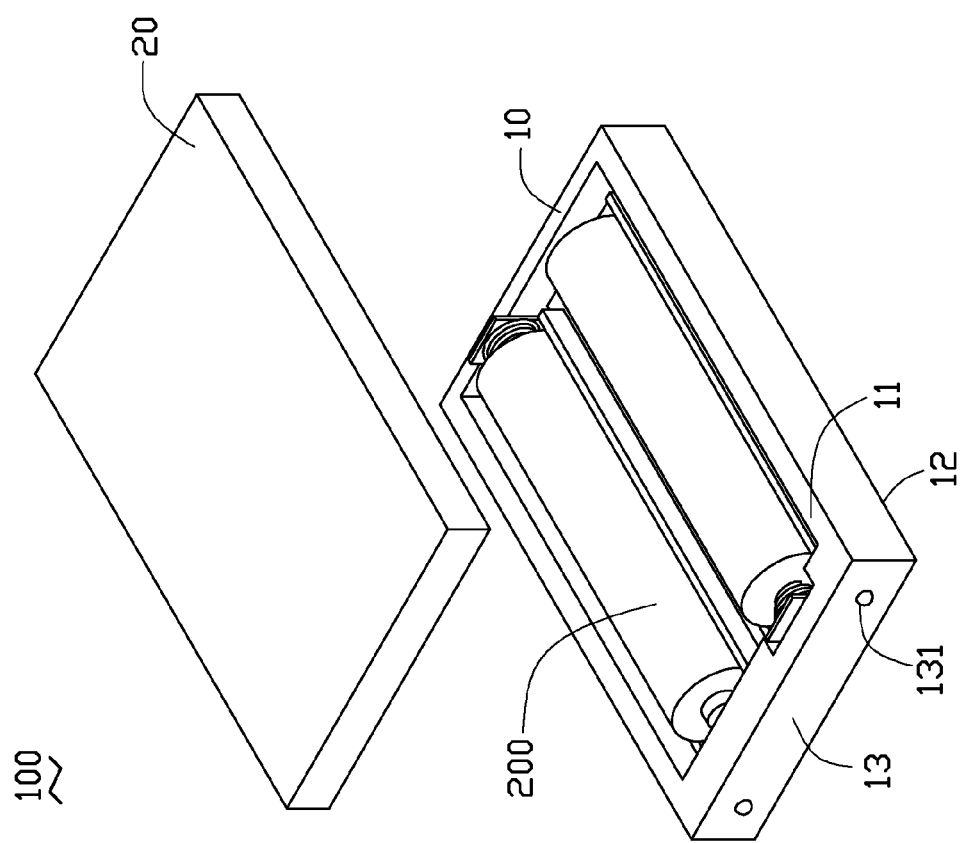
FIG. 1 is a perspective view showing a battery box in accordance with one embodiment, the battery box includes a detecting device.
Figure 2:
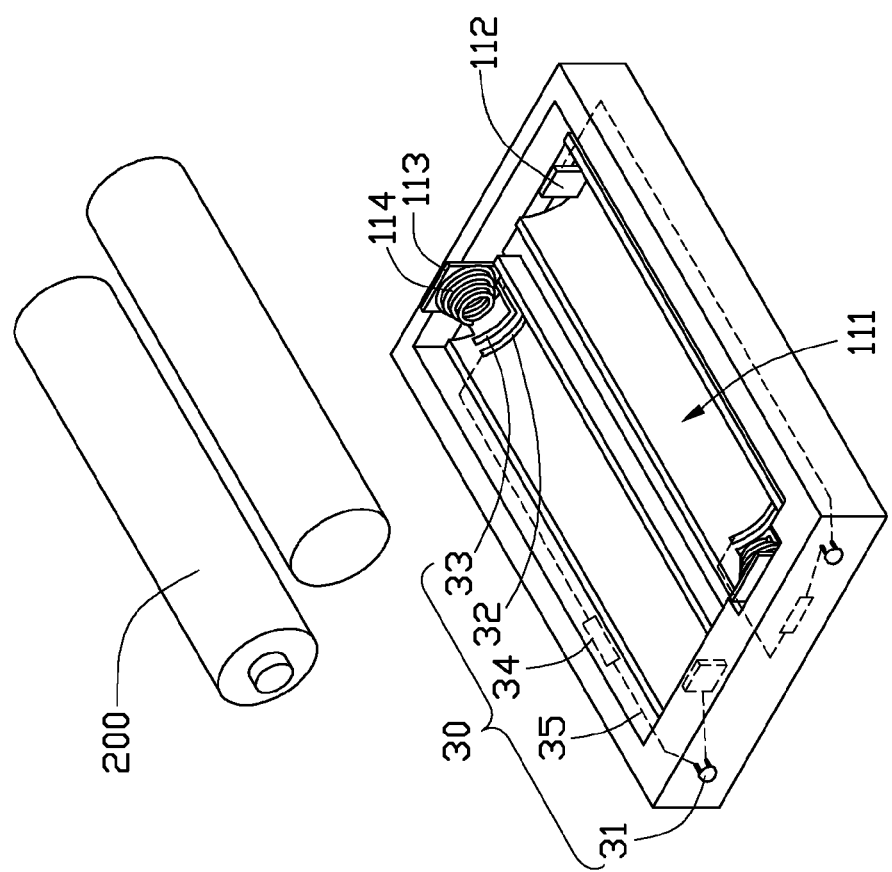
FIG. 2 is a schematic view showing the internal structure of the detecting device of FIG. 1.

Referring to FIGS. 1 and 2, a battery box 100 includes a main body 10, a lid 20, and a detecting device 30. The lid 20 is used for covering the main body 10 and to protect and contain at least one battery 200. The detecting device 30 is disposed on the main body 10 for detecting whether the battery 200 has a leak, and generating a leak warning signal to indicate that the battery 200 is leaking. In this embodiment, the battery 200 is a dry cell battery.

The main body 10 includes a first surface 11, a second surface 12, and a third surface 13. The first surface 11 and the second surface 12 are opposite to each other, and the third surface 13 perpendicularly connects the first surface 11 to the second surface 12. The main body 10 defines a pair of compartments 111 adjacent to each other in the first surface 11, and each of the compartments 111 is used for receiving one battery 200. Each of the compartments 111 is disposed with a first contact 112, a second contact 113, and a spring 114. When the battery 200 is mounted in the compartment 111, the first contact 112 is electrically connected to the positive terminal of the battery 200, and the second contact 113 is electrically connected to the negative terminal of the battery 200 through the spring 114. Therefore, the battery 200 can supply electric power to electronic components (not shown) through the first contact 112 and the second contact 113.

The third surface 13 defines two through holes 131 respectively corresponding to the two compartments 111 and respectively communicating with the two compartments 111.

Figure 3:
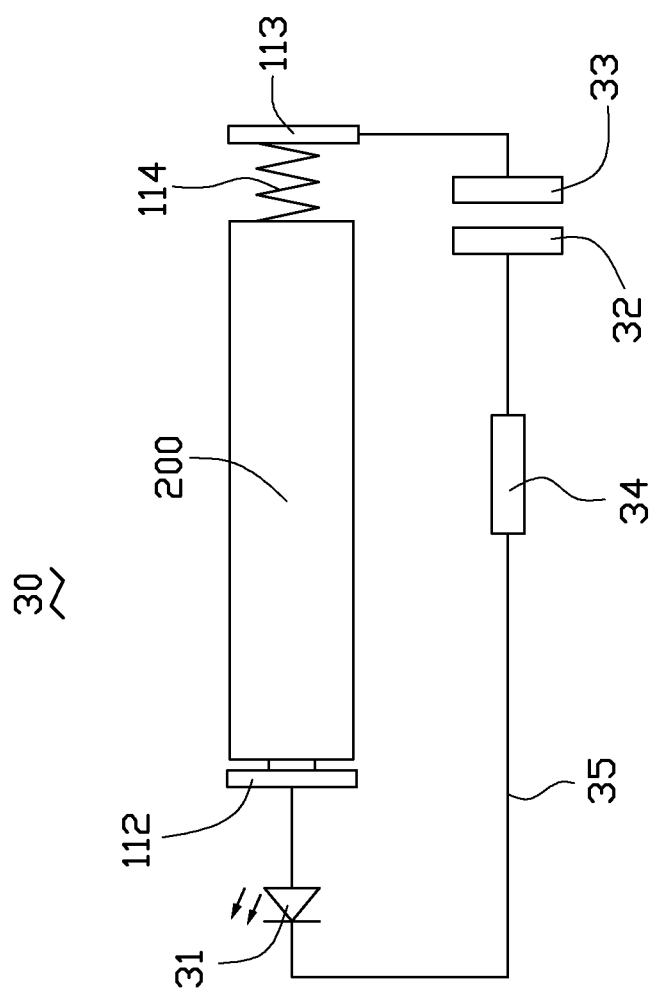
FIG. 3 is a circuit diagram of the detecting device of FIG. 1.

Referring also to FIG. 3, there are two detecting devices 30, each of the detecting devices 30 includes a warning unit 31, a first conductor 32, a second conductor 33, a resistor 34, and a conducting wire 35. In this embodiment, the warning unit 31 is a light emitting diode (LED) 31, the LED 31 is disposed in the through hole 131 and protrudes from the battery box 100. The first conductor 32 and the second conductor 33 are disposed in the bottom surface of the compartments 111 respectively, and are apart from each other. The first conductor 32 and the second conductor 33 are adjacent to the second contact 113.

An anode of the LED 31 is electrically connected to the first contact 112 via the conductive wire 35, a cathode of the LED 31 is electrically connected to the first conductor 32 through the resistor 34. The second conductor 33 is electrically connected to the second contact 113. When electrolyte is leaked from the battery 200, the first conductor 32 will be electrically connected to the second conductor 33 through the leaked electrolyte, thus the LED 31 emits light to indicate that the battery 200 has a leak. When the electrolyte is not leaking from the battery 200, the first conductor 32 is not electrically connected to the second conductor 33, therefore the LED 31 will not emit light. In other embodiments, the first conductor 32 is electrically connected to the first contact 112 through the resistor 34, the warning unit 31 is connected between the second conductor 33 and the second contact 113; the warning unit 31 can be a speaker, so that when the electrolyte is leaked from the battery 200, the speaker 31 outputs a sound to indicate that the battery 200 has a leak.

In view of the ability of the detecting device 30 to detect whether the electrolyte is leaking from the battery 200, when electrolyte is leaked from the battery 200, the warning unit 31 output the leak warning signal to timely inform users, damage from electrolyte leaked from defective batteries can be eliminated or at least minimized.

Alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. A detecting device for detecting a battery leak, a positive terminal of the battery electrically connected to a first contact, a negative terminal of the battery electrically connected to a second contact, the detecting device comprising:
   a first conductor;
   a second conductor electrically connected to the second contact but not electrically connected to the first conductor; and
   a warning unit electrically connected between the first contact and the first conductor;
   wherein the warning unit is used for emitting light to indicate that the battery has a leak; the warning unit comprises a light emitting diode (LED), an anode of the LED is connected to the first contact, a cathode of the LED is connected to the first conductor; when the battery leak is detected, the second conductor is electrically connected to the first conductor through electrolyte leaked out of the battery, and the warning unit is actuated by the battery to produce a warning signal.

2. The detecting device of claim 1, wherein the warning unit further comprises a resistor, the resistor is connected between the cathode of the light emitting diode and the first conductor.

3. A battery box comprising:
- a main body defining a compartment for receiving a battery;
- a first contact disposed in the compartment for being electrically connected to a positive terminal of the battery;
- a second contact disposed in the compartment for being electrically connected to a negative terminal of the battery; and
- a detecting device for detecting a battery leak, the detecting device comprising:
- a first conductor;
- a second conductor electrically connected to the second contact but not electrically connected to the first conductor; and
- a warning unit electrically connected between the first contact and the first conductor;
- wherein the warning unit is used for emitting light to indicate that the battery has a leak; the warning unit comprises a light emitting diode (LED), an anode of the LED is connected to the first contact, a cathode of the LED is connected to the first conductor; when the battery leak is detected, the second conductor is electrically connected to the first conductor through leaked electrolyte of the battery, and the warning unit is actuated by the battery to produce a warning signal.

4. The battery box of claim 3, wherein the warning unit further comprises a resistor, the resistor is connected between the cathode of the light emitting diode and the first conductor.

5. A detecting device for detecting a battery leak, a positive terminal of the battery electrically connected to a first contact, a negative terminal of the battery electrically connected to a second contact, the detecting device comprising:
- a first conductor electrically connected to the first contact;
- a second conductor; and
- a warning unit electrically connected between the first conductor and the second contact;
- wherein the warning unit is used for emitting light to indicate that the battery has a leak; the warning unit comprises a light emitting diode (LED), an anode of the LED is connected to the second contact, a cathode of the LED is connected to the second conductor;
- wherein when the battery leak is detected, the first conductor is electrically connected to the first conductor through electrolyte leaked out of the battery, and the warning unit is actuated by the battery to produce a leak warning signal.

6. The detecting device of claim 5, wherein the first conductor and the second conductor are adjacent to the second contact.

7. The detecting device of claim 5, wherein the warning unit further comprises a resistor, the resistor is connected between the cathode of the light emitting diode and the second conductor.

* * * * *